United States Patent
Baudlot et al.

(10) Patent No.: US 6,418,905 B1
(45) Date of Patent: Jul. 16, 2002

(54) INTERNAL COMBUSTION ENGINE WITH CONTROLLED IGNITION AND DIRECT INJECTION

(75) Inventors: Francois Baudlot, Draveil; Alain Floch, Marcoussis; Patrick Gastaldi, Gif-sur-Yvette; Jean-Christophe Lucas, Cergy; Didier Stephan, Bezons, all of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/646,901
(22) PCT Filed: Apr. 9, 1999
(86) PCT No.: PCT/FR99/00822
§ 371 (c)(1),
(2), (4) Date: Dec. 4, 2000
(87) PCT Pub. No.: WO99/53179
PCT Pub. Date: Oct. 21, 1999

(30) Foreign Application Priority Data

Apr. 10, 1998  (FR) .............................................. 98 04530

(51) Int. Cl.$^7$ ............................................... F02B 23/10
(52) U.S. Cl. ......................... 123/301; 123/302; 123/305
(58) Field of Search ................................. 123/295, 301, 123/302, 305, 298

(56) References Cited

U.S. PATENT DOCUMENTS

| | | | | |
|---|---|---|---|---|
| 5,305,720 A | * | 4/1994 | Ando et al. ............... | 123/193.4 |
| 5,711,269 A | * | 1/1998 | Oda et al. .................... | 123/262 |
| 5,878,712 A | * | 3/1999 | Wolters et al. .......... | 123/305 X |
| 5,890,466 A | * | 4/1999 | Pischinger .............. | 123/305 X |
| 5,960,767 A | * | 10/1999 | Akimoto et al. ........ | 123/305 X |

* cited by examiner

Primary Examiner—Tony M. Argenbright
(74) Attorney, Agent, or Firm—Oblon, Spivak, McClelland, Maier & Neustadt, P.C.

(57) ABSTRACT

An internal combustion engine with controlled ignition and direct ignition. In the internal combustion engine at least one intake duct can generate in a cylinder a flow referred to as "tumble", at least for certain engine operating phases. Further, a fuel injector is implanted so as to emerge in the cylinder such that the fuel jet tends to be intercepted by the part of the flow circulating in the direction opposite to that of the jet which is directed towards the spark plug.

11 Claims, 6 Drawing Sheets

INTERNAL COMBUSTION ENGINE WITH CONTROLLED IGNITION AND DIRECT INJECTION

BACKGROUND OF THE INVENTION

1. Field of the Invention

The invention relates to an internal combustion engine with controlled ignition and direct injection.

The invention relates more particularly to an internal combustion engine with controlled ignition and direct injection of the type in which a cylinder is bounded axially at the top by a lower face of a cylinder head, into which there open, each via a corresponding valve, at least one intake duct and at least one exhaust duct, the intake and exhaust valves being provided respectively on opposite sides of a reference plane containing the cylinder axis and bounding an intake side and an exhaust side of the cylinder.

2. Discussion of the Background

The use of direct injection in internal combustion engines with controlled ignition makes it possible to optimize engine operation with "lean" mixtures, or in other words carburetted mixtures in which there exists a large excess of air relative to the quantity of fuel introduced into the cylinder.

The use of lean mixtures makes it possible in particular to greatly lower fuel consumption and also to lower the maximum temperature attained during combustion, in turn making it possible to reduce the production of pollutants such as nitrogen oxides (NOx).

Similarly, the excess of air makes it possible to prevent the situation that part of the fuel remains unburned and is evacuated with the exhaust gases after combustion.

The carburetted mixture resulting from injection of fuel into the cylinder can be a homogeneous mixture or a stratified mixture in which the air-to-fuel ratio is not constant throughout the entire cylinder. For example, it may be desirable to obtain a higher fuel concentration in the vicinity of the spark plug, in order to facilitate starting of combustion.

Different solutions are known which make it possible to achieve stratified charges by means of direct injection.

A first solution comprises positioning the injector and spark plug such that the fuel jet is sprayed directly by the injector toward the spark plug. This method is a priori highly efficient, but it may be sensitive to uncertainties in positioning of the different elements and even more so to possible fouling of the injector nozzle, which can greatly modify the characteristics of the fuel jet.

A second known solution comprises achieving stratification by wall effect, wherein the fuel jet is directed toward a wall, for example the upper face of the piston, after which it is deflected toward the spark plug. An engine using this solution is described, for example, in European Patent A 0558072. Nevertheless, with this solution, considerable fuel condensation takes place on the walls, and the fuel condensed in this way is then very difficult to ignite.

SUMMARY OF THE INVENTION

The object of the invention is therefore to provide a general solution with regard to the geometry and layout of the essential elements of an internal combustion engine with controlled ignition, in such a way that optimal engine operation can be achieved with stratified "lean" charges.

Toward this objective, the invention proposes an engine of the type described in the foregoing, characterized in that at least one of the intake ducts is adapted to create in the cylinder, at least during certain stages of operation of the engine, a "tumble" flow in which the gases contained in the cylinder are caused to move rotationally around an axis perpendicular to the cylinder axis and parallel to the reference plane, and in that a fuel injector is located in such a manner that it enters the lower face of the cylinder head such that the fuel jet tends to be intercepted by the portion of the flow circulating in the sense opposite to that of the jet and directed toward a spark plug.

According to other characteristics of the invention:

the cylinder is axially bounded at the bottom by a piston, an upper face of which is provided with a cavity which is disposed eccentrically relative to a first side of the reference plane, and the injector is located on the opposite side to inject the fuel toward the cavity;

the sense of rotation of the flow is such that the movement of the gases is generally centripetal along a bottom wall of the cavity of the piston;

the injector is located substantially at the center of the lower face of the cylinder head;

the fuel is injected along an axis inclined by an angle of less than 30° relative to the cylinder axis;

the injector is located in such a manner that it enters an external radial portion of the lower face of the cylinder head;

the fuel is injected along an axis inclined by an angle of more than 50° relative to the cylinder axis;

the cavity is provided with a lateral wall element which, in the vicinity of the cylinder axis, has a large slope along the direction of the axis;

the piston is provided with a channel, which is hollowed out in the upper face of the side opposite the cavity, which is oriented parallel to the injection jet of the injector, and which opens into the lateral wall of the cavity;

the upper face of the piston is provided, on the side opposite the cavity, with a boss whose shape is substantially complementary to that of the portion facing the lower wall of the cylinder head, in order to cause a gas-flushing effect during arrival of the piston at top dead center;

the gases contained in the cylinder are caused to rotate counterclockwise relative to a view of the cylinder with the intake valves on the right and the exhaust valves on the left, the concave cavity is eccentrically disposed on the exhaust side of the reference plane, and the injector is located such that it enters the lower face of the cylinder head on the intake side;

the gases contained in the cylinder are caused to rotate clockwise relative to a view of the cylinder with the intake valves on the right and the exhaust valves on the left, the concave cavity is eccentrically disposed on the intake side of the reference plane, and in that the injector is located such that it enters the lower face of the cylinder head on the exhaust side;

the cylinder is provided with at least two intake valves;

the cylinder is provided with at least two exhaust valves;

the cylinder is provided with a single exhaust valve, which is offset transversely relative to the cylinder axis along a first sense of a direction parallel to the reference plane, and the injector is offset along an opposite sense of the said direction parallel to the reference plane;

the axis of the fuel jet is angularly offset relative to a plane perpendicular to the reference plane and containing axis A1;

the fuel jet extends inside a cone whose apex angle is substantially between 30 and 70°;

the lower face of the cylinder head has the shape of a roof with two inclined spans, which are bounded by a top ridge contained in the reference plane.

BRIEF DESCRIPTION OF THE DRAWINGS

Other characteristics and advantages of the invention will become apparent by reading the detailed description hereinafter, which will be better understood by referring to the attached drawings, wherein.

DESCRIPTION OF THE PREFERRED EMBODIMENTS

Figure 1:
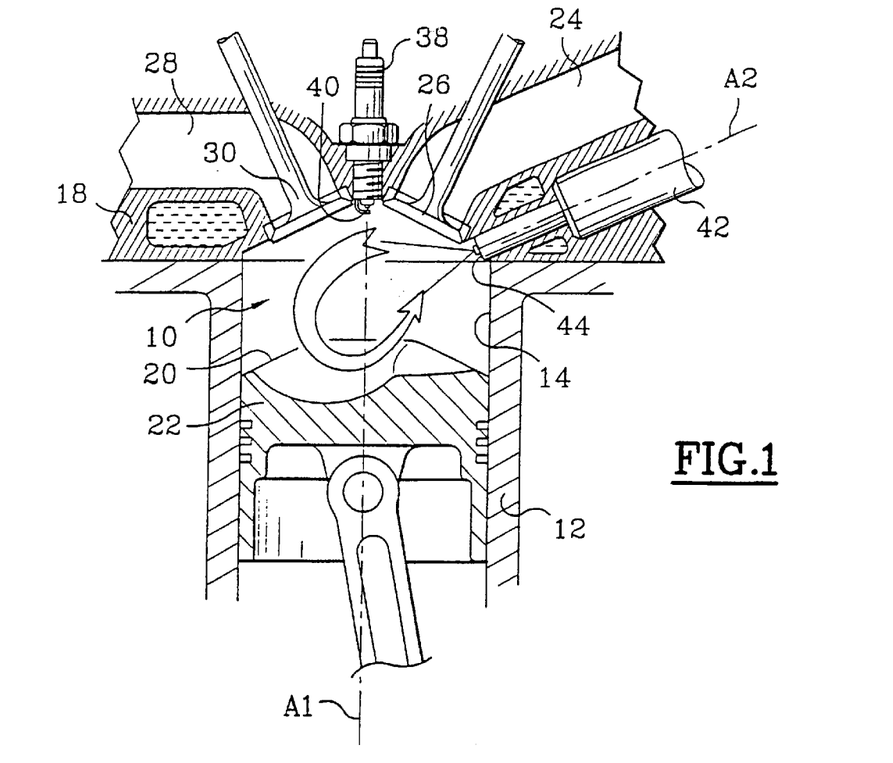
FIG. 1 is a schematic and partial view in axial section of an engine having the features of the invention.

There is illustrated in FIG. 1 a cylinder 10 of an internal combustion engine with controlled ignition and direct injection. Cylinder 10, with axis A1, is bounded in an engine block 12 by a cylindrical wall 14. Cylinder 10 is bounded at the top by lower face 16 of a cylinder head 18 and at the bottom by the upper face 20 of a piston 22 which, in known manner, performs reciprocating translational movement along axis A1.

Two air intake ducts 24 are provided in cylinder head 18, such that they open into lower face 16 thereof. Communication between intake ducts 24 and cylinder 10 is permitted or blocked by controlled intake valves 26.

In the same manner, exhaust ducts 28 open into cylinder 10 via exhaust valves 30.

Figure 2:
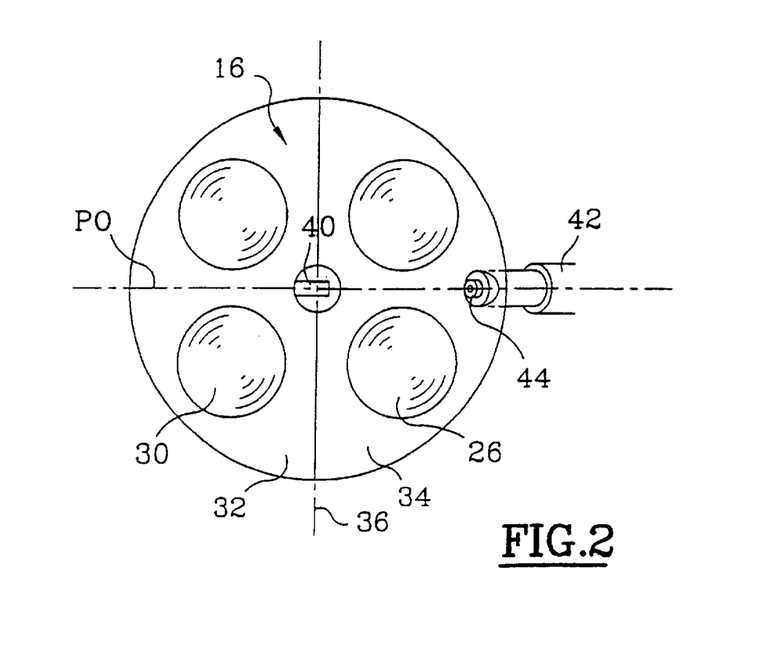
FIG. 2 is a view of the lower face of the cylinder head of the engine of FIG. 1, as seen from below along the cylinder axis.

In the practical example illustrated in the figures, lower face 16 of cylinder head 18 has the shape of a "roof", such that it is provided with two spans 32, 34 which are substantially planar and inclined on opposite sides of a top ridge 36. The roof angle ranges, for example, from 125 to 145°. Intake ducts 24 open into the one span 34, while exhaust ducts 28 open into the other span 32.

Top ridge 36 and axis A1 of cylinder 10 thus define a reference plane which in this cylinder bounds an intake side and an exhaust side.

Since this engine is provided with controlled ignition, a spark plug 38 is screwed into cylinder head 16 in such a way that its electrodes 40 enter cylinder 10 substantially on axis A1 thereof and thus at the level of top ridge 36 of lower face 16 of cylinder head 18.

In addition, an injector 42 is located in cylinder head 18 between intake ducts 24 or immediately therebelow, in such a way that a nozzle 44 of injector 42 enters cylinder 10 in order to be able to spray a fuel jet directly into the interior thereof.

In the first inventive embodiment illustrated in FIGS. 1 and 2, injector 42 sprays a substantially conical fuel jet, the axis of the fuel jet substantially coinciding with axis A2 of injector 42 which, as can be seen in FIGS. 1 and 2, forms an angle α of about 20 to 40° with a plane P perpendicular to axis A1 of cylinder 10. Axis A2 of injector 42 is contained in a plane which is that of FIG. 1, or in other words the plane perpendicular to top ridge 36.

According to a first aspect of the invention, cylinder 10 is equipped with at least one intake duct 24, which is provided with means to create, at least during certain stages of engine operation, turbulent movement of "tumble" type in cylinder 10. These means can be achieved simply by the shape of intake duct 24, but they can also be achieved by additional means interposed in the intake duct, which means may be movable or fixed and which can perturb the air flow in duct 24 in such a way as to create, in the interior of cylinder 10, turbulent flow which, in the plane perpendicular to top ridge 36, turns around an axis parallel to this ridge 36, in counterclockwise direction when cylinder 10 is viewed such that the intake valves are on the right and the exhaust valves are on the left. The flow having this sense of rotation, will be referred to hereinafter as "direct tumble".

By virtue of the turbulent movement created in this way and illustrated in particular in FIG. 1, the fuel jet tends to be intercepted by gas currents which cause accumulation of fuel in the neighborhood of electrodes 40 of spark plug 34. In this first embodiment it is obvious that the movement of the gases and that of the fuel form between them an angle of about 120°. Nevertheless, and especially by adapting the orientation of injector 42 by varying angle α, it is possible to vary the angle between the two movements such that the two movements are opposite to a greater or lesser extent.

Thus, according to a first aspect of the invention, stratification of the carburetted mixture is achieved by virtue of the aerodynamics of the gases in cylinder 10, by the fact that the fuel is intercepted by the moving gases, thus limiting contact of the fuel with the cylinder walls, or in other words limiting contact with upper face 20 of piston 22 and with lateral face 14 of cylinder 10.

To achieve good operation of the inventive engine, the fuel is preferably injected into the cylinder without having excessive momentum. It is in fact necessary that the injection force be such that the fuel can be deflected toward spark plug 38 before contacting piston 22. Toward this objective, it will be preferable to use an injector 42 with reduced penetration.

According to another aspect of the invention, upper face 20 of piston 22 is provided with a concave cavity 46 which makes it possible more effectively to channel the "tumble"-type turbulent movement of the gases contained in the cylinder, especially during the compression cycle while piston 22 is ascending in cylinder 10 toward top dead center.

This cavity 46 can be lens-shaped, for example, and can be centered relative to axis A1 of the cylinder.

Figure 3:
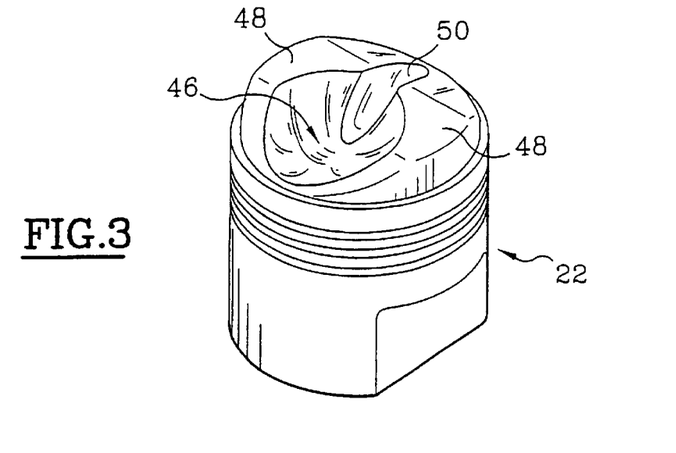
FIG. 3 is a schematic perspective view illustrating the shape of the upper face of the piston of the engine of FIG. 1.

Nevertheless, taking into account the sense of rotation of the turbulent movement of "direct tumble" type, this cavity 46 will be advantageously offset relative to axis A1 in such a way that it is disposed substantially below exhaust valves 30, as can be seen more particularly in FIG. 3.

Cavity 46 is therefore bounded by a lateral wall element 52, which extends close to axis A1, slightly on the exhaust side of the cylinder, and which has a steep slope so as to force the rotational movement of the gases admitted into the cylinder to ascend toward spark plug 38.

As can be seen in this figure, upper face 20 of piston 22 is also provided with a boss 48, disposed vertically below top ridge 36, which boss makes it possible to limit the residual volume of the cylinder when piston 22 is at top dead center, for the purpose of achieving an adequate gas compression ratio.

Nevertheless, it is also preferable that the fuel jet sprayed by injector 42 be directed substantially toward concave cavity 46 in order to be able to interact with the turbulent movement being channeled by the said cavity. This is all the more important when intensive stratification of the air-fuel mixture is desired, because then fuel injection takes place relatively late in the compression cycle, or in other words when piston 22 is approaching top dead center.

Thus, to ensure that the fuel jet reaches cavity 46 provided opposite injector 42 in cylinder 10 without impinging on upper face 20 of piston 22, cavity 46 has been provided with an extension in the form of channel 50, which extends substantially along the direction of the fuel jet sprayed by injector 42, toward this injector. The dimensions and depth of this channel, which is hollowed out within boss 18 of upper face 20, depend in particular on the geometry of the jet sprayed by injector 42.

In this configuration, this jet will preferably be chosen such that the spray cone has an apex angle ranging substantially between 30 and 70°.

Nevertheless, in this first embodiment, boss 48 is shaped such that it does not cause a flushing effect when piston 22 arrives at top dead center.

Figure 4:
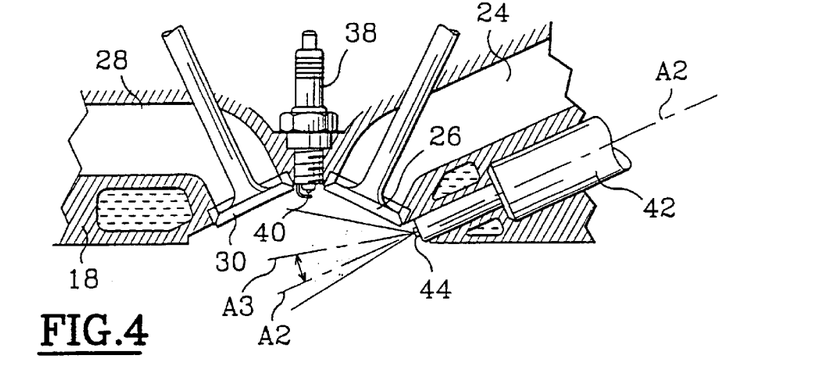
FIGS. 4 and 5 are schematic views in axial section illustrating two modifications of the embodiment of FIG. 1.
Figure 5:
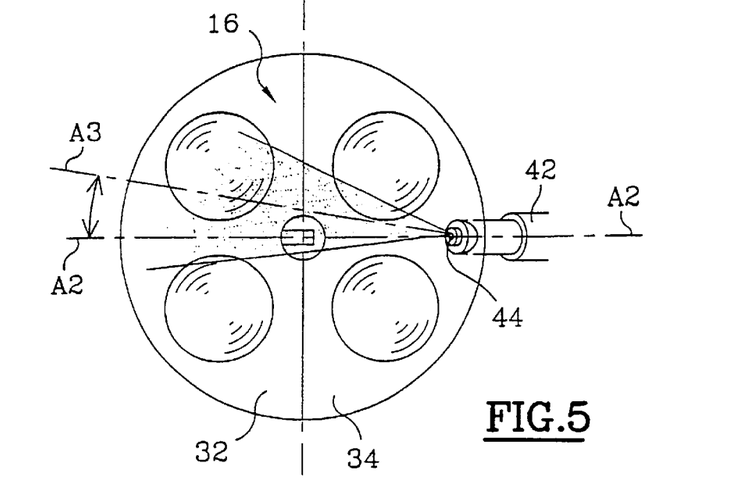

FIGS. 4 and 5 show two alternative embodiments of the invention in which there is used an injector 42 which sprays a fuel jet whose axis A3 is angularly offset relative to axis A2 of injector 42. This offset can be provided, as in the practical example of FIG. 4, in a plane containing both axis A1 of the cylinder and axis A2 of injector 42 or, as in the practical example of FIG. 5, in a plane perpendicular to axis A1 of cylinder 10.

In both cases, the objective is then to be able to optimize on the one hand the direction of the fuel jet and on the other hand the location of injector 42 in cylinder head 18, thus making it possible in particular to address constraints due to space requirements or to cooling of injector 42.

Of course, the two versions of angular offset of the fuel jet can be used in combination.

When there is used an injector 42 whose spray axis A3 differs inherently from axis A2 of injector 42, it may be beneficial to offset cavity 46 eccentrically not only along a direction perpendicular to top ridge 36 but also along a direction parallel thereto.

In the first embodiments just described, injector 42 is disposed "underneath" or between intake ducts 24, such that the nozzle of injector 42 enters a peripheral portion of lower face 16 of cylinder head 18, or in other words into a portion disposed radially toward the outside relative to axis A1 of the cylinder.

In contrast, in the inventive embodiments to be described hereinafter with reference to FIGS. 6 to 13, injector 42 is located such that it enters close to top ridge 36 and axis A1 of the cylinder.

Figure 6:
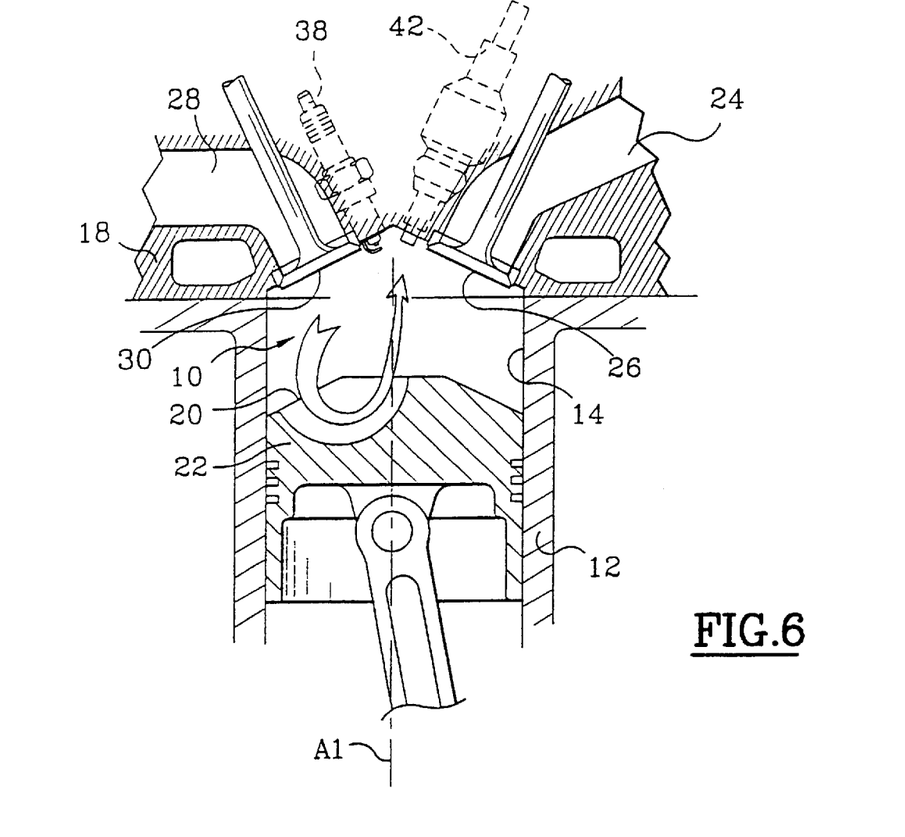
FIGS. 6 and 7, 8 and 9, 10 and 11, 12 and 13, are views similar to those of FIGS. 1 and 2, respectively illustrating four other embodiments of an engine according to the invention.
Figure 7:
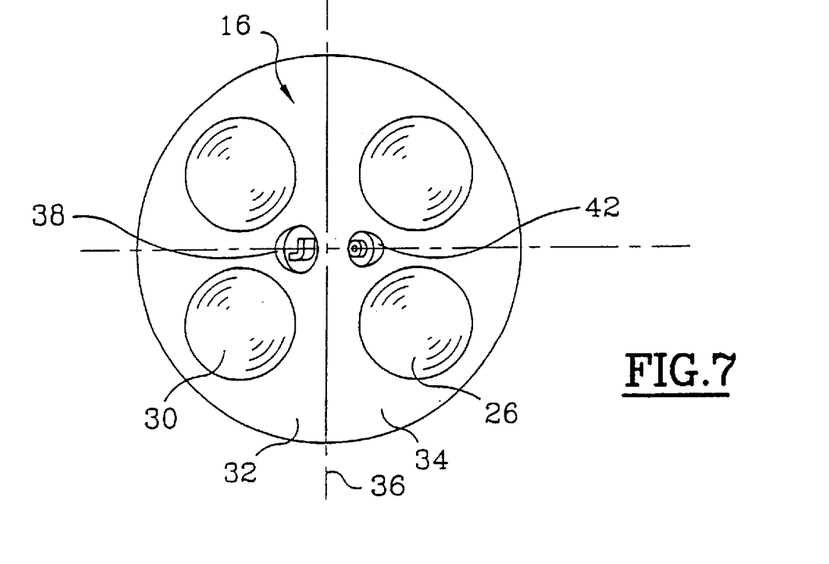

Thus, in the practical example of FIGS. 6 and 7, injector 42 is located in cylinder head 18 in such a way that nozzle 44 of the injector enters close to top ridge 36 but in span 34 on the intake side of the cylinder, while being oriented substantially perpendicular to exhaust span 32. In this case spark plug 38 is located on span 32 of the exhaust side of cylinder 10, but close to top ridge 36, such that its electrodes 40 are close to axis A1 of the cylinder.

This arrangement makes it possible, for example, to address particular space requirement constraints at the level of the cylinder head. It is also evident that one consequence of this configuration of the injector is that there can be used a piston 22 whose upper face 20 lacks the channel-shaped extension provided in the foregoing embodiments.

In addition, the angle formed by the respective flow directions of the gases and fuel tend to increase.

Figure 8:
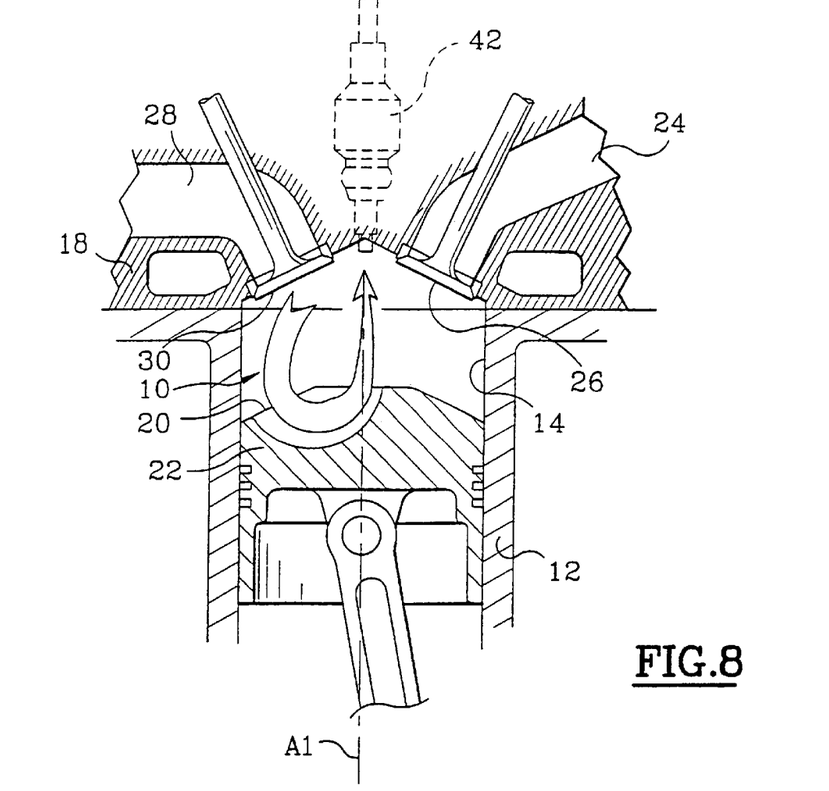
Figure 9:
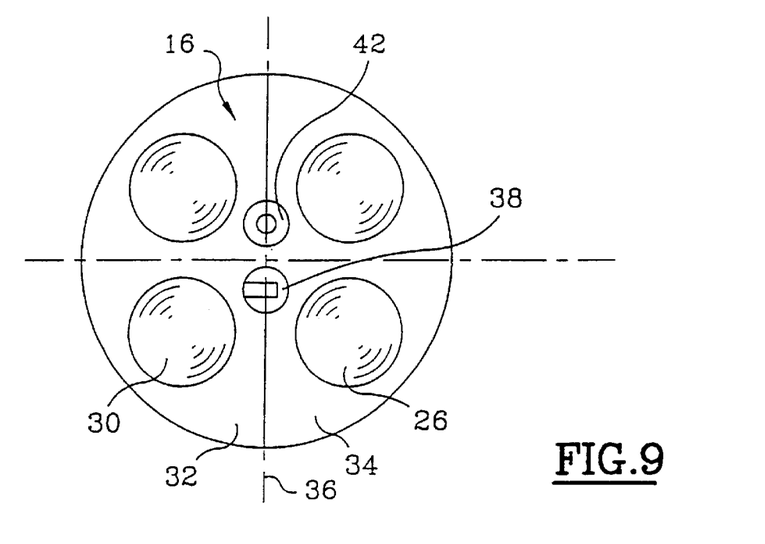

The embodiment illustrated in FIGS. 8 and 9 is a modification of the foregoing, wherein injector 42 and spark plug 38 are located parallel to axis A1 of the cylinder such that each enters top ridge 36, although each is offset along the direction of ridge 36 on one side of axis A1.

In both cases, it is evident that the movements of the fuel on the one hand and of the gases on the other hand are opposite by almost 180°. Thus, by adapting the injection pressure as a function of the force of the flow, the gases can be made to intercept the fuel and prevent it from progressing down into the cylinder, so that the fuel then remains accumulated in the vicinity of spark plug 38.

In addition, the fact that the momentums of the fuel and the gases have opposite directions favors atomization of the fuel droplets and therefore favors starting of combustion.

In the inventive practical examples shown in FIGS. 10 to 13, the "tumble" flow of the gases in the cylinder is flow of "inverse tumble" type, in the sense that the rotational movement takes place in clockwise sense when cylinder 10 is viewed in such a way that the intake side is on the right and the exhaust side is on the left.

To favor this "inverse tumble" movement, upper face 20 of piston 22 is provided with a concave cavity 46, which is preferably offset relative to axis A1 such that it is disposed substantially underneath intake valves 26.

Cavity 46 is also bounded by a lateral wall element 52, which extends close to axis A1, slightly on the exhaust side of the cylinder, and which has a steep slope for the purpose of forcing the rotational movement of the gases admitted into the cylinder to ascend toward spark plug 38.

The turbulent movement thus created therefore tends to hug the wall of bottom 54 of cavity 46 along a centripetal direction.

Figure 10:
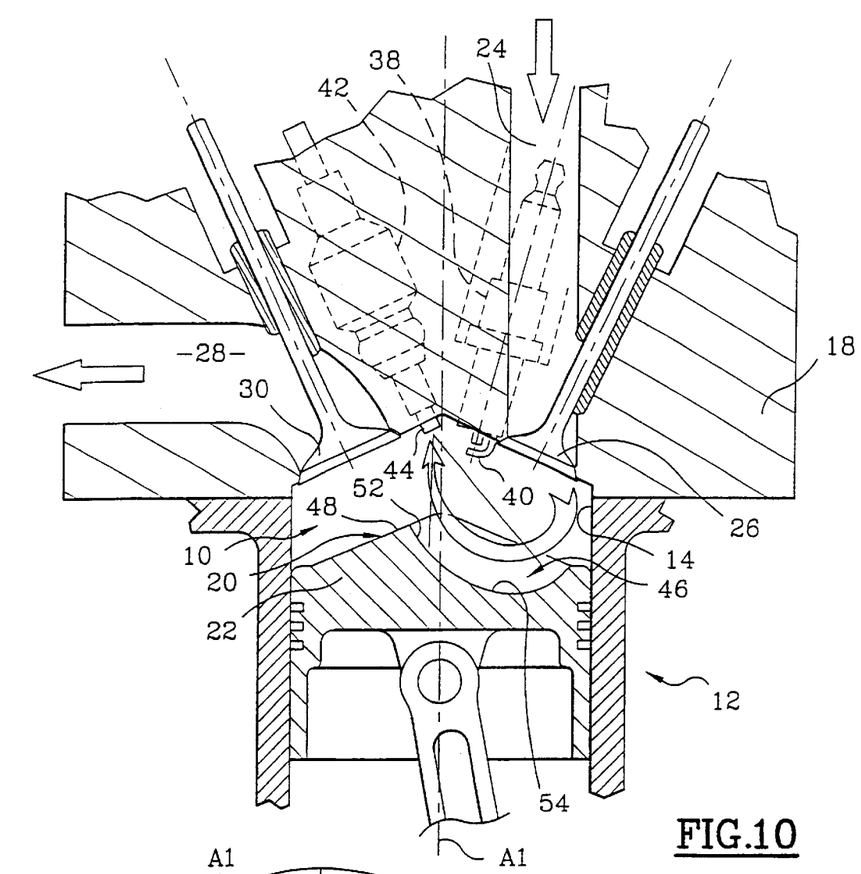
Figure 11:
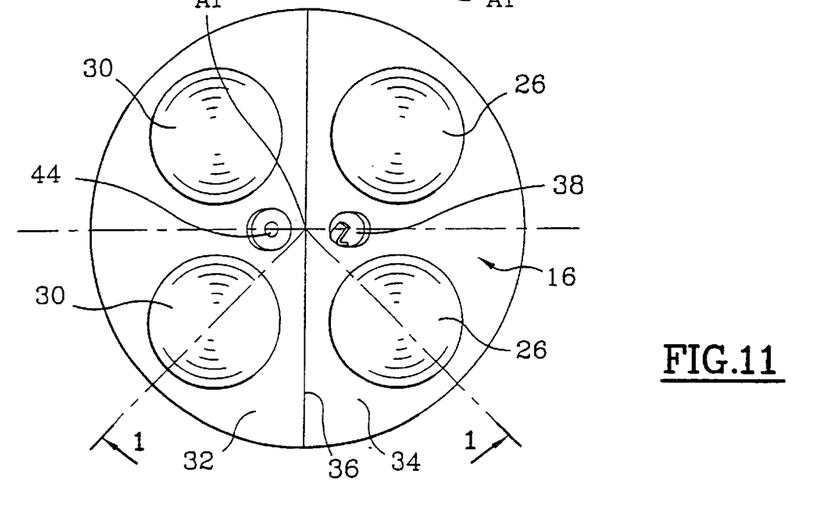

As can be seen in FIGS. 10 and 11, injector 42 is then located in cylinder head 18 such that nozzle 44 of the injector enters close to top ridge 36 but in span 32 on the exhaust side of the cylinder, while being oriented substantially perpendicular to exhaust span 32. In this case, spark plug 38 is located on span 34 of the intake side of cylinder 10, but close to top ridge 36, such that its electrodes 40 are close to axis A1 of the cylinder.

In the practical example illustrated in FIGS. 10 and 11, spark plug 38 is located on span 34 of the intake side of cylinder 10, but close to top ridge 36, such that its electrodes 40 are close to axis A1 of the cylinder.

In addition, it is evident that upper face 20 of piston 22 is provided, on the exhaust side of the cylinder, with a boss 48, which ensures that the residual volume of the cylinder is limited when piston 22 is at top dead center, in order to achieve an adequate gas compression ratio. In this embodiment, boss 48 can be used to create a flushing effect, by which the gases trapped in lower face 16 of cylinder head 18 and upper face 20 of piston 22 are flushed along a direction perpendicular to the direction of top ridge 36, toward axis A1.

Finally, it is evident that cylinder 10 is provided with an injector 42 located in cylinder head 18 such that nozzle 44 of the injector enters span 32 of the exhaust side of the cylinder.

In the practical example illustrated in FIG. 10, injector 42 is oriented substantially perpendicular to exhaust span 32 but, depending on space requirement constraints, it can be located in a more vertical orientation, without the need then to use an injector 42 spraying a fuel jet along an offset axis.

In fact, according to the invention, injector 42 sprays a fuel jet toward cavity 46 of piston 22, this cavity being provided on the intake side of cylinder 10. Preferably there is used an injector 42 possessing a jet of reduced penetration, or in other words a jet whose particles have relatively small momentum, and which exhibits, for example, a jet angle of about 40 to 60°.

By virtue of the inventive disposition, it is therefore obvious that, when fuel is injected into the cylinder, it tends to be intercepted by gases having turbulent movement, which gases cause deflection of the fuel particles toward electrodes 40 of the spark plug. In this inventive embodiment, the respective movements of the gases and the fuel form between them an angle almost equal to 180°. The fuel is thus confined to the vicinity of the spark plug by the aerodynamic movement of the gases. In addition, as seen hereinabove, the fuel and the gases interact such as to improve atomization of the fuel droplets and thus form a readily ignitable carburetted mixture.

Thus, by limiting contact of the fuel with the cylinder walls, or in particular by limiting contacts with upper face 20 of piston 22 and with lateral face 14 of cylinder 10, there is achieved stratification of the carburetted mixture merely by means of the aerodynamics of the gases in cylinder 10.

Figure 12:
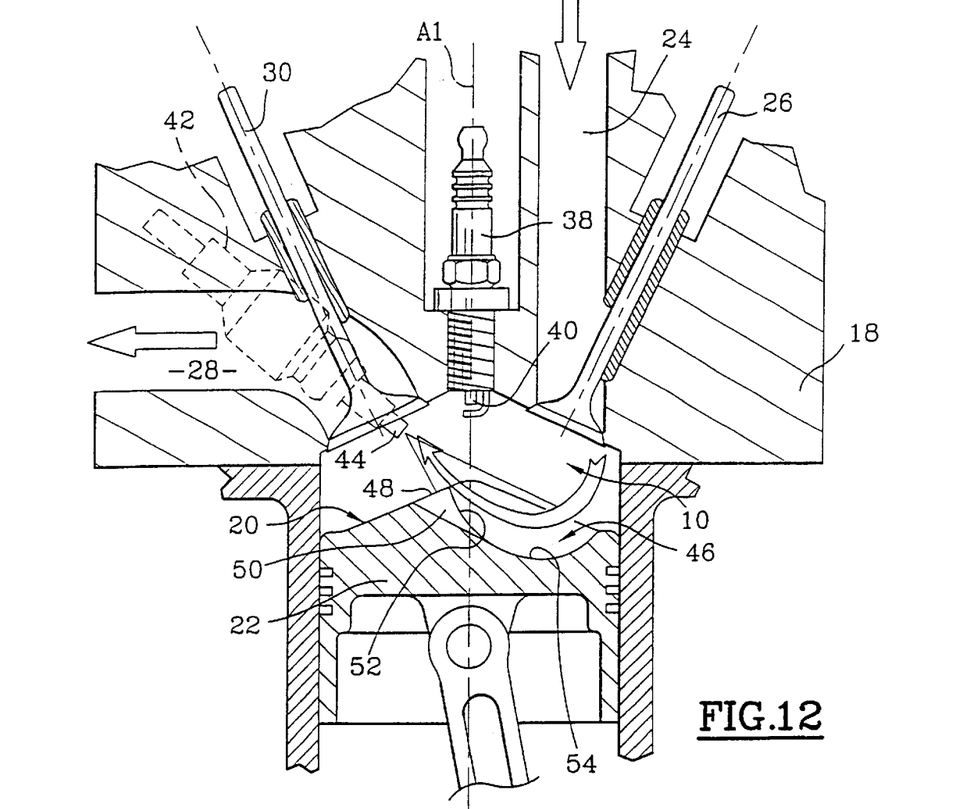
Figure 13:
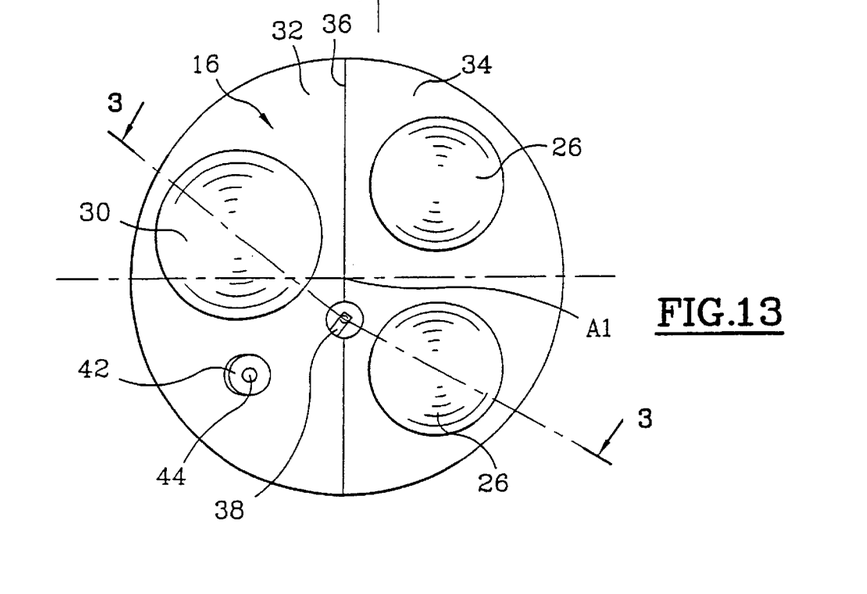

FIGS. 12 and 13 show a modification of the embodiment illustrated in FIGS. 10 and 11, wherein the cylinder is provided with only three valves, two being intake valves 26 and one being exhaust valve 30.

As can be seen in FIG. 13, exhaust valve 30 is offset along the direction of top ridge 36 relative to a central plane perpendicular to this ridge 36 and containing axis A1 of the cylinder. In this way there is achieved in exhaust span 32 a free space, in which there can be located injector 42, which is then disposed further from top ridge 36 than in the first embodiment.

In addition, it can also be seen that in this case spark plug 38 is located substantially vertically, parallel to axis A1 of the cylinder, on top ridge 36, but offset along the direction of this ridge, toward injector 42.

Of course, as can be seen in FIG. 13, the jet of injector 42 is directed toward cavity 46 provided on the intake side, in such a way that the fuel jet can interact with the turbulent movement which is channeled by this cavity and which in this case is a movement of the "inverse tumble" type.

However, when it is desired to achieve intensive stratification of the air-fuel mixture, fuel injection takes place relatively late during the compression cycle, or in other words when piston 22 is approaching top dead center. Thus, taking into account the position of injector 42, and knowing that the objective is to prevent the fuel jet from impinging on upper face 20 of piston 22, this second embodiments:been designed such that cavity 46 is provided with an extension 50, which extends substantially along the direction of the fuel jet sprayed by injector 42, toward this injector. This channel-shaped extension 50 is therefore hollowed out partly in boss 48 of upper face 20 of piston 22, and it opens into lateral wall 52 of cavity 46 as shown with reference to the first inventive embodiment illustrated in FIGS. 1 to 3.

In all cases, therefore, the invention makes it possible to achieve efficient stratification of the carburetted mixture merely by virtue of the internal aerodynamics of the cylinder while limiting contact of the fuel with the walls, the movements of the gases and of the fuel being oriented relative to one another such that the fuel is deflected and transported by the gases toward the spark plug.

In addition, it will be noted that all of the described embodiments provide for the presence of two intake ducts. It is quite obvious that the invention can also be implemented in the case of an engine provided only with a single intake duct or on the contrary provided with more than two.

What is claimed is:

1. An internal combustion engine with controlled ignition and direct injection, of the type in which a cylinder is bounded axially at the top by a lower face of a cylinder head, into which there open, each via a corresponding valve, at least one intake duct and at least one exhaust duct, the intake valves and exhaust valves being provided respectively on opposite sides of a reference plane containing the axis of the cylinder and bounding an intake side and an exhaust side of the cylinder, characterized in that at least one of the intake ducts is adapted to create in the cylinder, at least during certain stages of operation of the engine, a tumble flow in which the gases contained in the cylinder are caused to move rotationally around an axis perpendicular to the cylinder axis and parallel to the reference plane, and in that a fuel injector is located in such a manner that it enters the lower face of the cylinder head such that the fuel jet tends to be intercepted by the portion of the flow circulating in the sense opposite to that of the jet and directed toward a spark plug, and characterized in that the cylinder is axially bounded at the bottom by a piston, an upper face of which is provided with a cavity which is disposed eccentrically relative to a first side of the reference plane, and in that the injector is located on the opposite side to inject the fuel toward the cavity.

2. An engine according to claim 1, characterized in that the injector is located substantially at the center of the lower face of the cylinder head.

3. An engine according to claim 1, characterized in that the injector is located in such a manner that it enters an external radial portion of the lower face of the cylinder head.

4. An engine according to claim 1, characterized in that the cavity is provided with a lateral well element which, in the vicinity of the axis, has a large slope along the direction of the axis of the cylinder.

5. An engine according to claim 4, characterized in that the piston is provided with a channel, which is hollowed out in the upper face of the side opposite the cavity, which is oriented parallel to the injection jet of the injector, and which opens into the lateral wall of the cavity.

6. An engine according to claim 4, characterized in that the upper face of the piston is provided, on the side opposite the cavity, with a boss whose shape is substantially complementary to that of the portion facing the lower wall of the cylinder head, in order to cause a gas-flushing effect during arrival of the piston at top dead center.

7. An engine according to claim 1, characterized in that the lower face of the cylinder head has the shape of a roof with two inclined spans, which are bounded by a top ridge contained in the reference plane.

8. An internal combustion engine with controlled ignition and direct injection, of the type in which a cylinder is bounded axially at the top by a lower face of a cylinder head, into which there open, each via a corresponding valve, at least one intake duct and at least one exhaust duct, the intake valves and exhaust valves being provided respectively on opposite sides of a reference plane containing the axis of the cylinder and bounding an intake side and an exhaust side of the cylinder, characterized in that at least one of the intake ducts is adapted to create in the cylinder, at least during certain stages of operation of the engine, a tumble flow in which the gases contained in the cylinder are caused to move rotationally around an axis perpendicular to the cylinder axis and parallel to the reference plane, and in that a fuel injector is located in such a manner that it enters the lower face of the cylinder head such that the fuel jet tends to be intercepted by the portion of the flow circulating in the sense opposite to that of the jet and directed toward a spark plug, and characterized in that the gases contained in the cylinder are caused to assume a direct tumble movement, in that a concave cavity is eccentrically disposed on the exhaust side of the reference plane, and in that the injector is located such that it enters the lower face of the cylinder head on the intake side.

9. An internal combustion engine with controlled ignition and direct injection, of the type in which a cylinder is bounded axially at the top by a lower face of a cylinder head, into which there open, each via a corresponding valve, at least one intake duct and at least one exhaust duct, the intake valves and exhaust valves being provided respectively on opposite sides of a reference plane containing the axis of the cylinder and bounding an intake side and an exhaust side of the cylinder, characterized in that at least one of the intake ducts is adapted to create in the cylinder, at least during certain stages of operation of the engine, a tumble flow in which the gases contained in the cylinder are caused to move rotationally around an axis perpendicular to the cylinder axis and parallel to the reference plane, and in that a fuel injector is located in such a manner that it enters the lower face of the cylinder head such that the fuel jet tends to be intercepted by the portion of the flow circulating in the sense opposite to that of the jet and directed toward a spark plug, and characterized in that the gases contained in the cylinder are caused to assume an inverse tumble movement, in that the concave cavity is eccentrically disposed on the intake side of the reference plane, and in that the injector is located such that it enters the lower face of the cylinder head on the exhaust side.

10. An engine according to claim 9, characterized in that the cylinder is provided with a single exhaust valve, which is offset transversely relative to the cylinder axis along a first sense of a direction parallel to the reference plane, and in that the injector is offset along an opposite sense of the said direction parallel to the reference plane.

11. An internal combustion engine comprising:

a cylinder bounded axially at a top by a lower face of a cylinder head, said cylinder having an axis;

at least one intake duct connected to said cylinder, said at least one intake duct having an intake valve;

at least one exhaust duct connected to said cylinder, said at least one exhaust duct having an exhaust valve, said intake valve and said exhaust valve being provided on opposite sides of a reference plane containing said axis of said cylinder, said reference plane bounding an intake side and an exhaust side of said cylinder; and a fuel injector configured to inject fuel into said cylinder, wherein said at least one intake duct is adapted to create in said cylinder a tumble flow in which gases contained in said cylinder are caused to move rotationally around an axis perpendicular to said axis of said cylinder and parallel to said reference plane, wherein said cylinder is axially bounded at a bottom by a piston, said piston having an upper face that is provided with a cavity, said cavity being disposed eccentrically relative said reference plane, and wherein said fuel injector is located on a side of said reference plane opposite to said cavity to inject fuel toward said cavity.

* * * * *